United States Patent
Zeng et al.

(10) Patent No.: US 12,541,530 B2
(45) Date of Patent: Feb. 3, 2026

(54) SYSTEMS AND METHODS FOR METADATA DRIVEN DATA RECONCILIATION

(71) Applicant: JPMORGAN CHASE BANK, N.A., New York, NY (US)

(72) Inventors: Liangzhao Zeng, Cupertino, CA (US); Vincent Hong, Sunnyvale, CA (US); Jimmy Hong, Belmont, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 89 days.

(21) Appl. No.: 18/491,625

(22) Filed: Oct. 20, 2023

(65) Prior Publication Data

US 2025/0131009 A1  Apr. 24, 2025

(51) Int. Cl.
*G06F 16/25* (2019.01)
*G06F 16/21* (2019.01)
*G06F 16/22* (2019.01)
*G06F 16/2457* (2019.01)

(52) U.S. Cl.
CPC .......... *G06F 16/258* (2019.01); *G06F 16/211* (2019.01); *G06F 16/2282* (2019.01); *G06F 16/24573* (2019.01)

(58) Field of Classification Search
CPC .. G06F 16/258; G06F 16/211; G06F 16/2282; G06F 16/24573
See application file for complete search history.

(56) References Cited

U.S. PATENT DOCUMENTS

| | | | | |
|---|---|---|---|---|
| 10,838,973 | B2* | 11/2020 | Srivastava | G06F 16/212 |
| 10,846,298 | B2* | 11/2020 | Simmons | G06F 16/285 |
| 11,487,725 | B2* | 11/2022 | Kolli | G06F 16/287 |
| 12,124,453 | B2* | 10/2024 | Bansal | G06F 16/24578 |
| 12,204,873 | B1* | 1/2025 | Toledano | G06F 16/285 |
| 2015/0134660 | A1* | 5/2015 | Yan | G06F 16/285 707/737 |
| 2018/0121525 | A1* | 5/2018 | Simmons | G06F 16/285 |
| 2018/0196859 | A1* | 7/2018 | Srivastava | G06F 16/2365 |
| 2019/0258942 | A1* | 8/2019 | Gu | G06F 16/258 |
| 2022/0222233 | A1* | 7/2022 | Enuka | G06F 16/285 |
| 2023/0014348 | A1* | 1/2023 | Kolli | G06F 16/215 |
| 2025/0045278 | A1* | 2/2025 | Bansal | G06F 16/81 |

* cited by examiner

*Primary Examiner* — Huawen A Peng
(74) *Attorney, Agent, or Firm* — GREENBERG TRAURIG LLP (57) ABSTRACT

Systems and methods for metadata driven data reconciliation are disclosed. A method may include: (1) identifying origin dataset metadata for an origin dataset; (2) identifying new dataset metadata for a new dataset; (3) comparing the origin dataset metadata to the new dataset metadata; (4) identifying a sample size for the origin dataset, wherein the sample size comprises a number of cells; (5) extracting an origin dataset sample of the sample size of random cells from the origin dataset; (6) generating origin dataset features for the origin dataset sample; (7) generating new dataset features for the new dataset; (8) searching for the origin dataset features in the new dataset features; and (9) returning a matching result in response to the origin dataset features being found in the new dataset features.

20 Claims, 4 Drawing Sheets

SYSTEMS AND METHODS FOR METADATA DRIVEN DATA RECONCILIATION

BACKGROUND OF THE INVENTION

1. Field of the Invention

Embodiments relate to systems and methods for metadata driven data reconciliation.

2. Description of the Related Art

Data reconciliation plays an important role in data migration/reflection that often occurs during a modernization process. During migration, data may get corrupted, lost, or duplicated. Reconciliation helps to ensure that data in new system is the same as in the original system. Data reconciliation is also important in machine learning (ML) operations to guarantee the data quality, feature consistency, and access models' performance.

Reconciling information across large data sets, at volume, is a challenge. Current solutions perform time-consuming field by field checks and do not scale well. These traditional approaches require a reload and comparison of the full datasets, record by record, field by field. This often requires at least one—if not both—datasets to be copied to a location used by a comparison engine. This may not be feasible since business sensitive dataset is not allowed to copy to other locations nor does it scale.

SUMMARY OF THE INVENTION

Systems and methods for metadata driven data reconciliation are disclosed. According to an embodiment, a method for metadata driven data reconciliation may include: (1) identifying, by a metadata comparison computer program, origin dataset metadata for an origin dataset; (2) identifying, by the metadata comparison computer program, new dataset metadata for a new dataset; (3) comparing, by the metadata comparison computer program, the origin dataset metadata to the new dataset metadata; (4) identifying, by the metadata comparison computer program, a sample size for the origin dataset, wherein the sample size may include a number of cells; (5) extracting, by the metadata comparison computer program, an origin dataset sample of the sample size of random cells from the origin dataset; (6) generating, by the metadata comparison computer program, origin dataset features for the origin dataset sample; (7) generating, by the metadata comparison computer program, new dataset features for the new dataset; (8) searching, by the metadata comparison computer program, for the origin dataset features in the new dataset features; and (9) returning, by the metadata comparison computer program, a matching result in response to the origin dataset features being found in the new dataset features.

In one embodiment, the metadata comparison computer program identifies the sample size for the origin dataset, extracts the origin dataset sample, generates the origin dataset features, generates the new dataset features for the new dataset, and searches the origin dataset features in the new dataset features if the origin dataset metadata matches the new dataset metadata.

In one embodiment, the method may also include: returning, by the metadata comparison computer program, a not matching result in response to the origin dataset metadata not matching the new dataset metadata or the origin dataset features not matching the new dataset features.

In one embodiment, the method may also include: executing, by the metadata comparison computer program, an automated action in response to the origin dataset metadata not matching the new dataset metadata or the origin dataset features not matching the new dataset features. The automated action may include deleting the new dataset and replicating the origin dataset.

In one embodiment, the origin dataset and the new dataset comprise tables.

In one embodiment, the origin dataset metadata may include an origin dataset schema, an origin dataset volume, and origin dataset checks, assertions, and/or constraints, and the new dataset metadata may include a new dataset schema, a new dataset volume, and new dataset checks, assertions, and/or constraints. The origin dataset schema and the new dataset schema may include a number of columns, a number of rows, and a number of cells, and the origin dataset checks, assertions, and/or constraints and the new dataset checks, assertions, and/or constraints comprise a number of empty columns or duplication.

In one embodiment, the sample size may be based on a population size of the origin dataset, a margin of error, a standard deviation, and a confidence level.

In one embodiment, the origin dataset features may include a hash at least a portion of origin dataset sample, and the new dataset features may include a hash at least a portion of new dataset.

According to another embodiment, a non-transitory computer readable storage medium, may include instructions stored thereon, which when read and executed by one or more computer processors, cause the one or more computer processors to perform steps comprising: identifying origin dataset metadata for an origin dataset; identifying new dataset metadata for a new dataset; comparing the origin dataset metadata to the new dataset metadata; identifying a sample size for the origin dataset, wherein the sample size may include a number of records; extracting an origin dataset sample of the sample size of random cells from the origin dataset; generating origin dataset features for the origin dataset sample; generating new dataset features for the new dataset; searching for the origin dataset features in the new dataset features; and returning a matching result in response to the origin dataset features being found in the new dataset features.

In one embodiment, the identification of the sample size for the origin dataset, the extraction of the origin dataset sample, the generation of the origin dataset features, the generation of the new dataset features for the new dataset, and the searching for the origin dataset features in the new dataset features are in response to the origin dataset metadata matching the new dataset metadata.

In one embodiment, the non-transitory computer readable storage medium may also include instructions stored thereon, which when read and executed by one or more computer processors, cause the one or more computer processors to perform steps comprising: returning a not matching result in response to the origin dataset metadata not matching the new dataset metadata or the origin dataset features not founded in the new dataset features.

In one embodiment, the non-transitory computer readable storage medium may also include instructions stored thereon, which when read and executed by one or more computer processors, cause the one or more computer processors to perform steps comprising: executing an automated action in response to the origin dataset metadata not matching the new dataset metadata or the origin dataset features not found the new dataset features. The automated action may include deleting the new dataset and replicating the origin dataset.

In one embodiment, the origin dataset and the new dataset comprise tables.

In one embodiment, the origin dataset schema and the new dataset schema may include a number of columns, a number of rows, and a number of cells, and the origin dataset checks, assertions, and/or constraints and the new dataset checks, assertions, and/or constraints comprise a number of empty columns or duplication.

In one embodiment, the sample size may be based on a population size of the origin dataset, a margin of error, a standard deviation, and a confidence level.

In one embodiment, the origin dataset features may include a hash at least a portion of origin dataset sample, and the new dataset features may include a hash at least a portion of new dataset.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for metadata driven data reconciliation.

Embodiments may leverage pre-defined telemetry information in a dataset (e.g., for a table, schema, row count, etc.) that is created and collected during initial processing (e.g., file creation and/or file movement). Such metadata information provides a basis for foundational verification with very low cost. To provide higher confidence of data comparison results, embodiments further perform statistic feature verification on the datasets. Embodiments provide random sampling and row level checksum-based feature verification, which requires zero configuration for the user and does not reveal any sensitive information during the reconciliation processes. By randomly sampling a certain amount of records from the source dataset and determining whether those sampled records are available in the new dataset, this approach provides a high degree of confidence in the reconciliation.

In one embodiment, a hash function may be applied to each record, so that the hash output does not contain any meaningful information.

Embodiments may also support user-defined statistical and group-wise characteristics of the dataset to address special concerns, in terms of semantic equivalence among the datasets. Statistical testing provides extra confidence about the reconciliation results.

Figure 1:
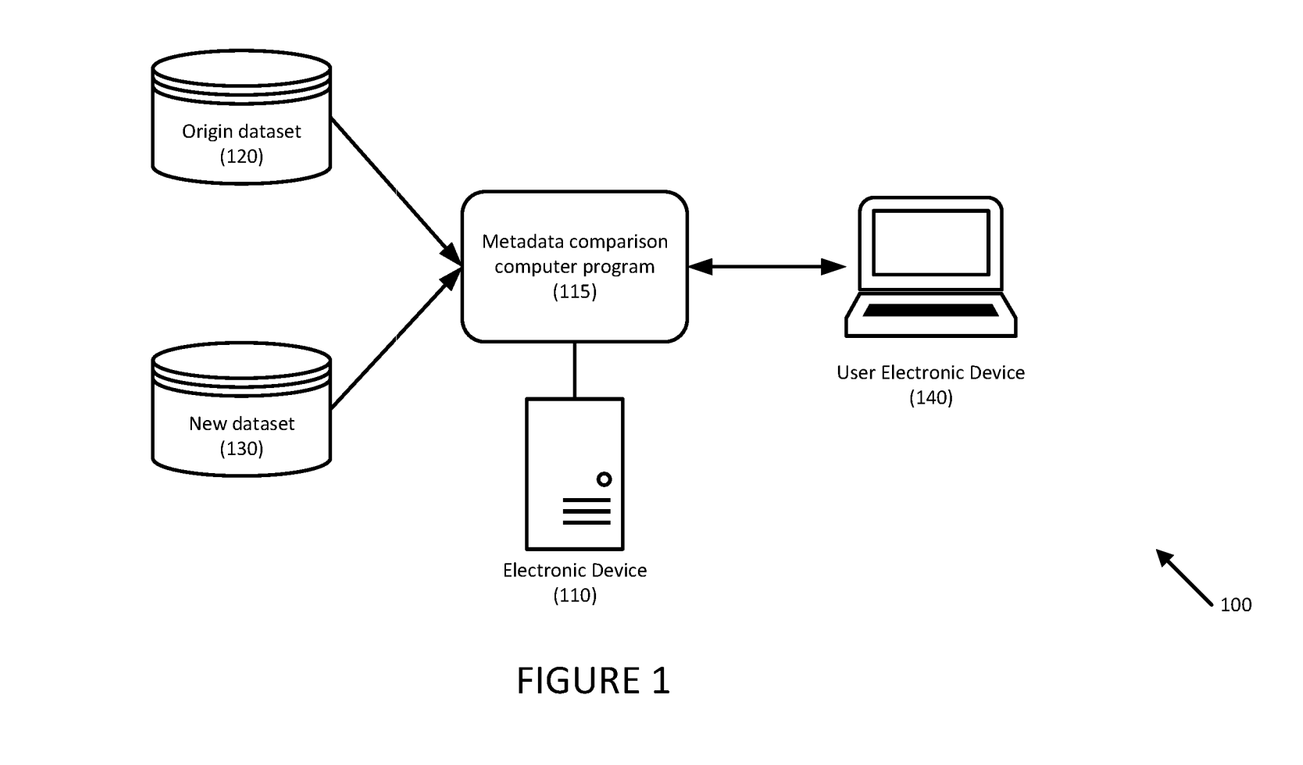
FIG. 1 illustrates a system for metadata driven data reconciliation according to an embodiment.

Referring to FIG. 1, a system for metadata driven data reconciliation is disclosed according to an embodiment. System 100 may include electronic device 110, which may be a server (e.g., physical and/or cloud-based), computers (e.g., workstations, desktops, laptops, notebooks, tablets, etc.), smart devices, Internet of Things (IoT) appliances, etc.

Electronic device 110 may execute metadata comparison computer program 115, which may receive data from origin dataset 120 and new dataset 130. Origin dataset may be, for example, a dataset that is being migrated from a first location (e.g., physical storage) to a second location (e.g., cloud storage). Metadata comparison computer program 115 may verify whether new dataset 130 is the same as origin dataset 120, and may provide the output of the verification to user electronic device 140.

Figure 2A:
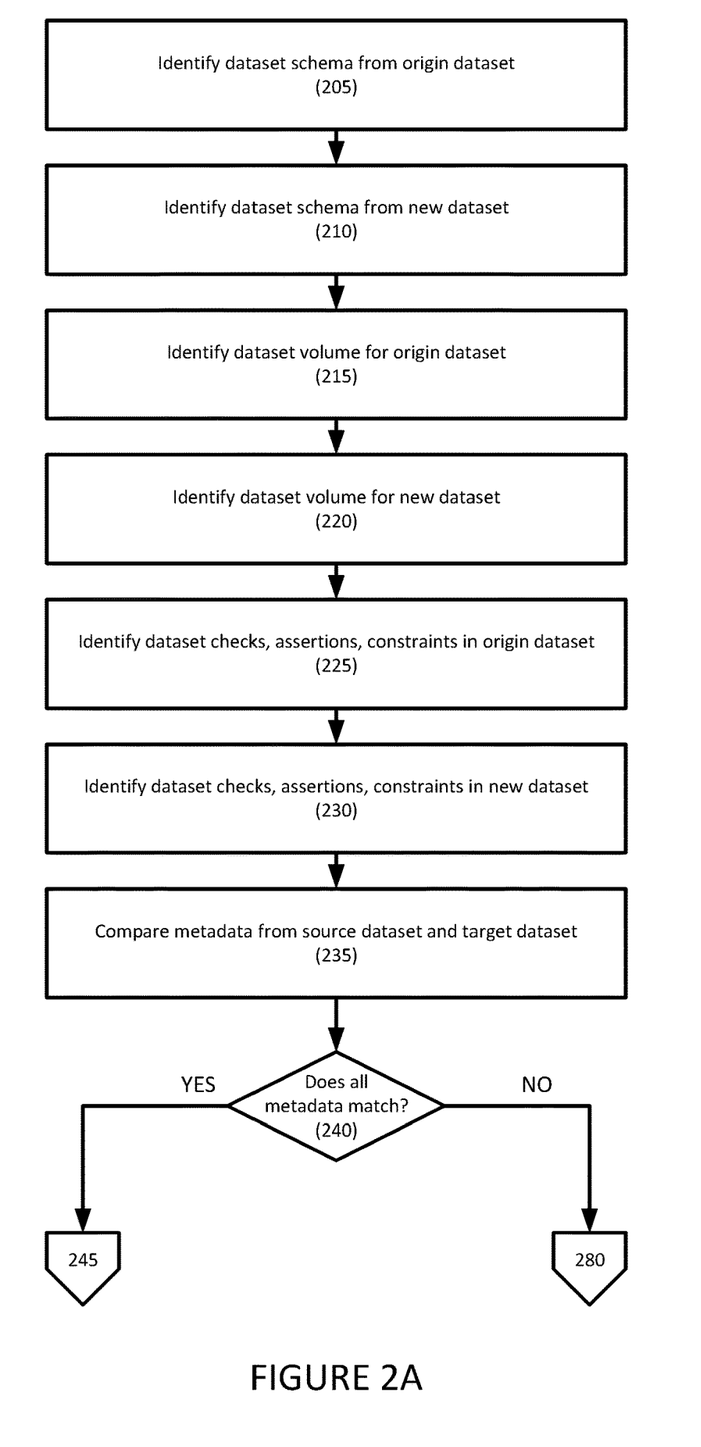
FIGS. 2A and 2B illustrate a method for metadata driven data reconciliation according to an embodiment.
Figure 2B:
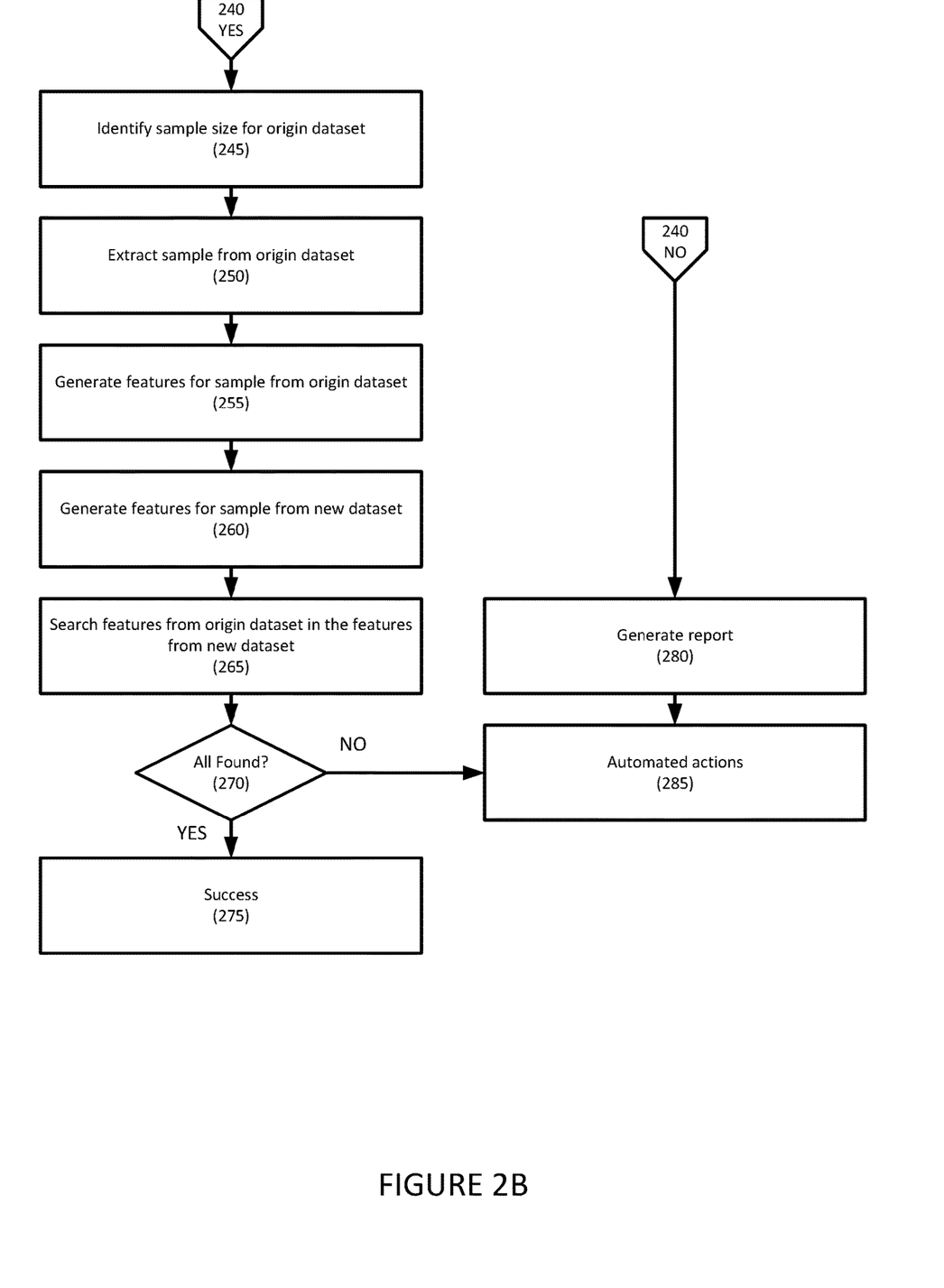

Referring to FIGS. 2A and 2B, a method for metadata driven data reconciliation is disclosed according to an embodiment.

In step 205, a computer program, such as a metadata comparison computer program, may identify a data structure from an origin dataset. The data structure may include, for example, a number of columns, a number of rows, a number of cells, etc.

In step 210, the computer program may identify a data structure from a new dataset. The same data structure may be extracted from the new dataset.

In step 215, the computer program may identify a dataset volume for the origin dataset. For example, the computer program may identify the file size, the row count, etc. of the origin dataset.

In step 220, the computer program may identify a dataset volume for the new dataset.

In step 225, the computer program may identify dataset checks, assertions, and/or constraints for the origin dataset. For example, the computer program may identify a number of records with empty columns, any duplication in the dataset, etc.

In step 230, the computer program may identify dataset checks, assertions, and/or constraints for the new dataset.

In step 235, the computer program may compare the metadata from the source dataset with the metadata of the new dataset. For example, the computer program may compare the data structures, the dataset volumes, the dataset checks, assertions, and constraints, and the samples.

In step 240, if all metadata matches, in step 245, the computer program may identify a sample size for the origin dataset. The sample size may be based on the population size of the origin dataset (e.g., a number of cells), a confidence level (e.g., a percentage), and a margin of error (e.g., a percentage).

In one embodiment, the sample size may be calculated using the following equation:

$$\text{Sample size} = \frac{\frac{z^2 \times p(1-p)}{e^2}}{1 + \left(\frac{z^2 \times p(1-p)}{e^2 N}\right)}$$

where:
  N is the population size;
  e is the margin of error (a percentage in decimal form);
  p is the standard of deviation; and
  z represents the confidence level in terms of standard deviation away from the mean.

In one embodiment, the computer program may identify the population size of the origin dataset. The margin of error, the standard deviation, and the confidence level in the standard deviation may be parameters provided by a user, may be default parameters used by the organization, etc.

In step 250, the computer program may extract a sample from the origin dataset. In one embodiment, the cells for the sample may be randomly selected.

In set 255, to maintain data security, as one or more cells are sampled, features (e.g., a hash of the cell(s)) may be created and cached. In another embodiment, the samples for all sampled cells may be concatenated and hashed into one or more features.

In step 260, the computer program may generate and cache features for the new dataset using the same technique that was used to generate the features for the origin dataset. For example, the computer program may generate dataset features for every record in the new dataset.

In step 265, the computer program search features from the origin dataset in the features from the new dataset. For example, the computer program may search features sampled from the origin dataset in the new dataset's generated features.

If, in step 270, all features are found, in step 275, the computer program may generate a result indicating that the datasets match. The result may include the specified confidence level and the margin of error.

If all metadata does not match, or if all features are not found, in step 280, the computer program may generate a report, such as a missing feature report, and may identify the metadata that does not match, or may note that the feature(s) do not match.

In step 285, an automated action may be taken. For example, the new dataset may be deleted and the replication process may be re-initiated. Examples of automated actions may include copying certain data to the new dataset, removing duplications, etc.

Figure 3:
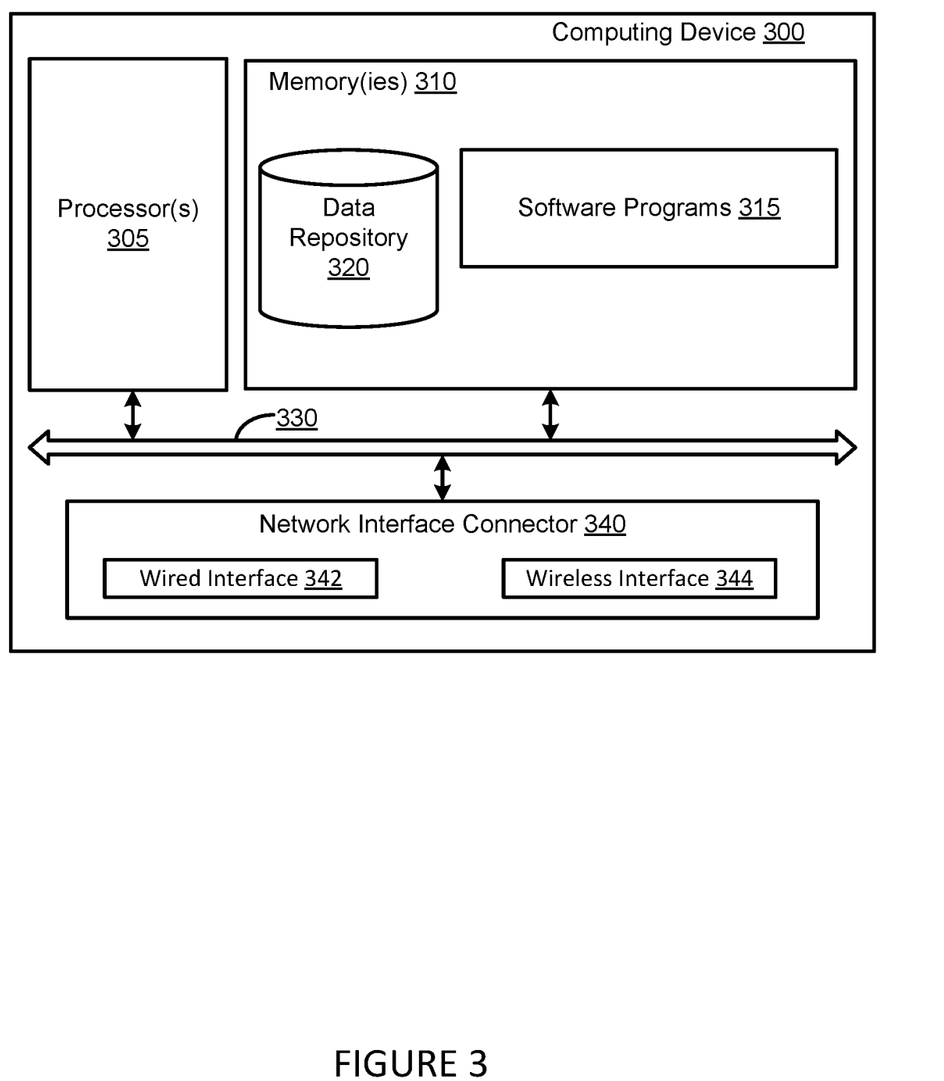
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for metadata driven data reconciliation, comprising:
    identifying, by a metadata comparison computer program, origin dataset metadata for an origin dataset comprising an origin dataset schema, an origin dataset volume, and origin dataset checks, assertions, and/or constraints;

identifying, by the metadata comparison computer program, new dataset metadata for a new dataset comprising a new dataset schema, a new dataset volume, and new dataset checks, assertions, and/or constraints;

comparing, by the metadata comparison computer program, the origin dataset metadata to the new dataset metadata;

identifying, by the metadata comparison computer program, a sample size for the origin dataset, wherein the sample size comprises a number of cells;

extracting, by the metadata comparison computer program, an origin dataset sample of the sample size of random cells from the origin dataset, wherein the sample size comprises an extract from the origin dataset, wherein the sample size is based on a population size of the origin dataset, a confidence level, or a margin of error, and wherein the sample size is determined by:

$$\text{Sample size} = \frac{\frac{z^2 \times p(1-p)}{e^2}}{1 + \frac{z^2 \times p(1-p)}{e^2 N}}$$

wherein N is the population size, e is the margin of error, p is a standard of deviation, and z represents the confidence level in terms of the standard deviation away from a mean;

generating, by the metadata comparison computer program, origin dataset features for the origin dataset sample;

generating, by the metadata comparison computer program, new dataset features for the new dataset;

searching, by the metadata comparison computer program, for the origin dataset features in the new dataset features; and returning, by the metadata comparison computer program, a matching result in response to the origin dataset being found in the new dataset features.

2. The method of claim 1, wherein the metadata comparison computer program identifies the sample size for the origin dataset, extracts the origin dataset sample, generates the origin dataset features, generates the new dataset features for the new dataset, and searches the origin dataset features for the new dataset features in response to the origin dataset metadata matching the new dataset metadata.

3. The method of claim 1, further comprising:
returning, by the metadata comparison computer program, a not matching result in response to the origin dataset metadata not matching the new dataset metadata or the origin dataset features not matching the new dataset features.

4. The method of claim 1, further comprising:
executing, by the metadata comparison computer program, an automated action in response to the origin dataset metadata not matching the new dataset metadata or the origin dataset features not matching the new dataset features.

5. The method of claim 4, wherein the automated action comprises deleting the new dataset and replicating the origin dataset.

6. The method of claim 1, wherein the origin dataset and the new dataset comprise tables.

7. The method of claim 1, wherein the origin dataset metadata comprises an origin dataset schema, an origin dataset volume, and origin dataset checks, assertions, and/or constraints, and the new dataset metadata comprises a new dataset schema, a new dataset volume, and new dataset checks, assertions, and/or constraints.

8. The method of claim 1, wherein the origin dataset schema and the new dataset schema comprises a number of columns, a number of rows, and a number of cells, and the origin dataset checks, assertions, and/or constraints and the new dataset checks, assertions, and/or constraints comprise a number of empty columns or duplication.

9. The method of claim 1, wherein the sample size is based on a population size of the origin dataset, a margin of error, a standard deviation, and a confidence level.

10. The method of claim 1, wherein the origin dataset features comprises a hash at least a portion of origin dataset sample, and the new dataset features comprises a hash at least a portion of new dataset.

11. A non-transitory computer readable storage medium, including instructions stored thereon, which when read and executed by one or more computer processors, cause the one or more computer processors to perform steps comprising:
identifying origin dataset metadata for an origin dataset;
identifying new dataset metadata for a new dataset;
comparing the origin dataset metadata to the new dataset metadata;
identifying a sample size for the origin dataset, wherein the sample size comprises a number of cells;
extracting an origin dataset sample of the sample size of random cells from the origin dataset, wherein the sample size comprises an extract of the origin dataset, wherein the sample size is based on a population size of the origin dataset, a confidence level, or a margin of error, and wherein the sample size is determined by:

$$\text{Sample size} = \frac{\frac{z^2 \times p(1-p)}{e^2}}{1 + \frac{z^2 \times p(1-p)}{e^2 N}}$$

wherein N is the population size, e is the margin of error, p is a standard of deviation, and z represents the confidence level in terms of the standard deviation away from a mean;

generating origin dataset features for the origin dataset sample;

generating new dataset features for the new dataset;

searching for the origin dataset features in the new dataset features; and returning a matching result in response to the origin dataset features being found in the new dataset features.

12. The non-transitory computer readable storage medium of claim 11, wherein the identifying of the sample size for the origin dataset, the extracting of the origin dataset sample, the generating of the origin dataset features, the generating of the new dataset features for the new dataset, and the searching of the origin dataset features for the new dataset features are in response to the origin dataset metadata matching the new dataset metadata.

13. The non-transitory computer readable storage medium of claim 11, further including instructions stored thereon, which when read and executed by one or more computer processors, cause the one or more computer processors to perform steps comprising:
returning a not matching result in response to the origin dataset metadata not matching the new dataset metadata or the origin dataset features not matching the new dataset features.

14. The non-transitory computer readable storage medium of claim 11, further including instructions stored thereon, which when read and executed by one or more computer processors, cause the one or more computer processors to perform steps comprising:

executing an automated action in response to the origin dataset metadata not matching the new dataset metadata or the origin dataset features not matching the new dataset features.

15. The non-transitory computer readable storage medium of claim 14, wherein the automated action comprises deleting the new dataset and replicating the origin dataset.

16. The non-transitory computer readable storage medium of claim 11, wherein the origin dataset and the new dataset comprise tables.

17. The non-transitory computer readable storage medium of claim 11, wherein the origin dataset metadata comprises an origin dataset schema, an origin dataset volume, and origin dataset checks, assertions, and/or constraints, and the new dataset metadata comprises a new dataset schema, a new dataset volume, and new dataset checks, assertions, and/or constraints.

18. The non-transitory computer readable storage medium of claim 17, wherein the origin dataset schema and the new dataset schema comprises a number of columns, a number of rows, and a number of cells, and the origin dataset checks, assertions, and/or constraints and the new dataset checks, assertions, and/or constraints comprise a number of empty columns or duplication.

19. The non-transitory computer readable storage medium of claim 11, wherein the sample size is based on a population size of the origin dataset, a margin of error, a standard deviation, and a confidence level.

20. The non-transitory computer readable storage medium of claim 11, wherein the origin dataset features comprises a hash at least a portion of origin dataset sample, and the new dataset features comprises a hash at least a portion of new dataset.

* * * * *